(12) United States Patent
Jin et al.

(10) Patent No.: US 12,030,230 B2
(45) Date of Patent: Jul. 9, 2024

(54) RESIN-SEALED ELECTRONIC COMPONENT AND METHOD FOR MANUFACTURING THE SAME

(71) Applicant: Hitachi Metals, Ltd., Tokyo (JP)

(72) Inventors: Yiming Jin, Tokyo (JP); Akitoshi Fujimori, Tokyo (JP)

(73) Assignee: Proterial, Ltd., Tokyo (JP)

( * ) Notice: Subject to any disclaimer, the term of this patent is extended or adjusted under 35 U.S.C. 154(b) by 387 days.

(21) Appl. No.: 17/517,389

(22) Filed: Nov. 2, 2021

(65) Prior Publication Data
US 2022/0134618 A1 May 5, 2022

(30) Foreign Application Priority Data

Nov. 4, 2020 (JP) .................................. 2020-184409

(51) Int. Cl.
*B29C 45/14* (2006.01)
*G01L 3/10* (2006.01)
*B29L 31/34* (2006.01)

(52) U.S. Cl.
CPC .. *B29C 45/14836* (2013.01); *B29C 45/14467* (2013.01); *B29C 45/14639* (2013.01); *G01L 3/105* (2013.01); *B29L 2031/3481* (2013.01)

(58) Field of Classification Search
None
See application file for complete search history.

(56) References Cited

U.S. PATENT DOCUMENTS

| | | | |
|---|---|---|---|
| 9,857,253 B2 | 1/2018 | Toyama | |
| 2009/0020906 A1* | 1/2009 | Neumann | ............... B29C 48/05 |
| | | | 425/86 |
| 2017/0160151 A1 | 6/2017 | Toyama | |
| 2018/0017149 A1* | 1/2018 | Takeuchi | ............. B62D 5/0454 |
| 2018/0067007 A1* | 3/2018 | Shimizu | .................. B29C 45/37 |
| 2023/0272848 A1* | 8/2023 | Miyazaki | .......... B29C 45/14336 |
| | | | 74/425 |

FOREIGN PATENT DOCUMENTS

| | | |
|---|---|---|
| CN | 108068285 A * | 11/2017 |
| EP | 0028297 A1 * | 8/1980 |

(Continued)

OTHER PUBLICATIONS

"Notice of Reasons for Refusal" Office Action issued in JP 2020-184409; mailed by the Japanese Patent Office on Apr. 2, 2024.

*Primary Examiner* — Yung-Sheng M Tsui
*Assistant Examiner* — Melody Tsui
(74) *Attorney, Agent, or Firm* — Studebaker & Brackett PC (57) ABSTRACT

A resin-sealed electronic component includes an electronic component main body sealed with a resin housing. The resin housing includes a pair of resin members aligned in a first direction with sandwiching a housing space housing the electronic component main body, and a sealing member including a molding resin and being molded so as to cover at least a portion of each of the pair of resin members. A portion of one resin member of the pair of resin members and a portion of the other resin member are aligned in a second direction intersecting the first direction to constitute a suppression structure that suppresses the molding resin from entering the housing space.

5 Claims, 8 Drawing Sheets

(56) References Cited

FOREIGN PATENT DOCUMENTS

| | | | |
|---|---|---|---|
| JP | 2017-049124 A | 3/2017 | |
| JP | 2017-106879 A | 6/2017 | |
| JP | 6555023 B2 * | 8/2019 | |
| JP | 2020-085814 A | 6/2020 | |
| WO | WO-2021175750 A1 * | 9/2021 | ....... B29C 45/14491 |

* cited by examiner

50 SECOND RECESS
521b INNER CIRCUMFERENTIAL SURFACE
522b INNER CIRCUMFERENTIAL SURFACE
523 SECOND PROTRUSION

RESIN-SEALED ELECTRONIC COMPONENT AND METHOD FOR MANUFACTURING THE SAME

CROSS-REFERENCE TO RELATED APPLICATION

The present patent application claims the priority of Japanese patent application No. 2020-184409 filed on Nov. 4, 2020, and the entire contents of Japanese patent application No. 2020-184409 are hereby incorporated by reference.

TECHNICAL FIELD

The present invention relates to a resin-sealed electronic component having an electronic component main body sealed with a resin housing, and a method for manufacturing the same.

BACKGROUND ART

Conventionally, a resin-sealed electronic component having an electronic component main body sealed with a resin housing has been used as, e.g., a torque sensor for detecting torque of a shaft configured to transmit a drive force of a drive source in an automobile. The present applicant has proposed such a torque sensor that is described in Patent Literature 1.

The torque sensor described in Patent Literature 1 has a coil member as the electronic component main body formed by winding an insulated wire around a resin bobbin, an inner molded portion formed by molding a resin so as to cover the coil member, and an outer molded portion formed by molding a resin so as to cover the inner molded portion. Plural inclined grooves, which are inclined at 45° respectively on one side and the other side relative to an axial direction of a shaft as a detection target and intersect with each other, are formed on an outer circumferential surface of the bobbin and the insulated wire is housed in these inclined grooves. Covering the coil member with the inner molded portion and the outer molded portion improves environmental resistance and allows the torque sensor to be arranged even in, e.g., a portion exposed to lubricating oil or muddy water, etc.

The present applicant has also proposed a torque sensor in which detection coils are formed of wiring patterns respectively provided on plural stacked flexible substrates (see Patent Literature 2). By forming the detection coils in this way, it is not necessary to wind the insulated wire around the bobbin as in the Patent Literature 1 and it is possible to reduce the cost.

CITATION LIST

Patent Literatures

Patent Literature 1: JP 2020-85814A
Patent Literature 2: JP 2017-49124A

SUMMARY OF INVENTION

For example, if the plural flexible substrates described in Patent Literature 2 are sealed with a sealing member made of a molding resin to form a torque sensor, it is possible to obtain a low-cost torque sensor with excellent environmental resistance. However, when the plural flexible substrates are directly sealed with the molding resin, the flexible substrates may be deformed by fluid pressure of the molding resin during molding the sealing member, resulting in that, e.g., the detection coils are not formed in an appropriate shape or wire breakage occurs.

As a countermeasure against this problem, the molding resin could be molded in a state in which the plural flexible substrates are housed in a housing space formed by combining a pair of pre-molded resin members, so that at least a portion of each of the pair of resin members is covered. However, even in this case, the flexible substrates may be deformed or damaged if a large amount of molten molding resin enters the housing space through a gap between the pair of resin members during molding the sealing member.

Therefore, it is an object of the invention to provide a resin-sealed electronic component and a method for manufacturing the same, which can seal an electronic component main body with a resin housing including a sealing member made of a molding resin while suppressing deformation or damage, etc., on the electronic component main body due to the molten molding resin.

For solving the above problems, one aspect of the present invention provides:

a resin-sealed electronic component, comprising:
  an electronic component main body sealed with a resin housing,
  wherein the resin housing comprises a pair of resin members aligned in a first direction with sandwiching a housing space housing the electronic component main body, and a sealing member comprising a molding resin and being molded so as to cover at least a portion of each of the pair of resin members, and
  wherein a portion of one resin member of the pair of resin members and a portion of the other resin member are aligned in a second direction intersecting the first direction to constitute a suppression structure that suppresses the molding resin from entering the housing space.

Further, for solving the above problems, another aspect of the present invention provides: a method for manufacturing the resin-sealed electronic component as described above, the method comprising:
  arranging the pair of resin members in a mold in a state in which the electronic component main body is housed in the housing space; and
  injection molding to mold the sealing member by injecting the molten molding resin into the mold,
  wherein, of the portion of the one resin member and the portion of the other resin member, the portion located farther from the housing space in the second direction is pressed toward the housing space by fluid pressure of the molten molding resin during the injection molding.

Effect of the Invention

According to a resin-sealed electronic component and a method for manufacturing the same of the present invention, it is possible to seal an electronic component main body with a resin housing including a sealing member made of a molding resin while suppressing deformation or damage, etc., on the electronic component main body due to the molten molding resin.

DESCRIPTION OF EMBODIMENTS (Embodiment)

Figure 1:
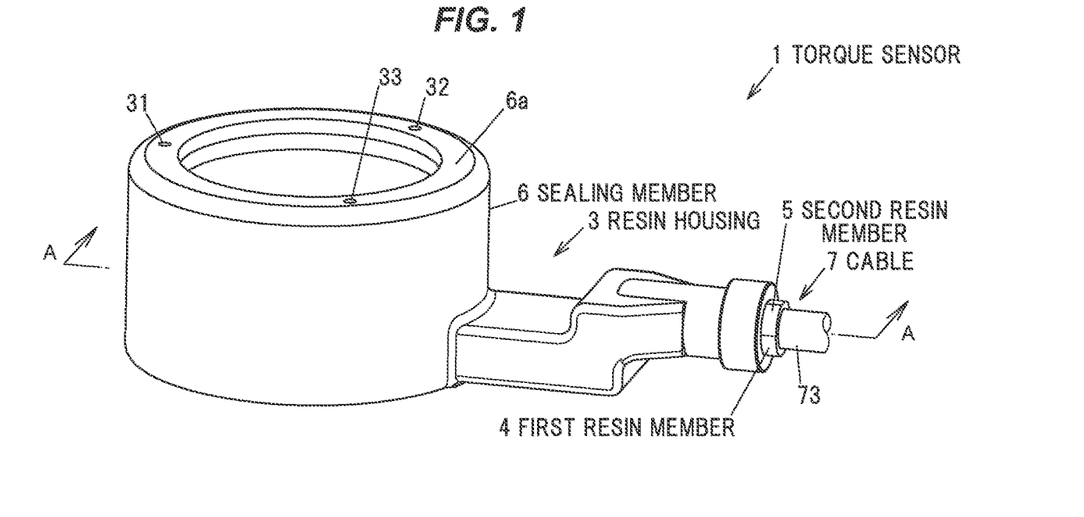
FIG. 1 is an external perspective view showing a torque sensor as an example of a resin-sealed electronic component in an embodiment of the present invention.
Figure 2:
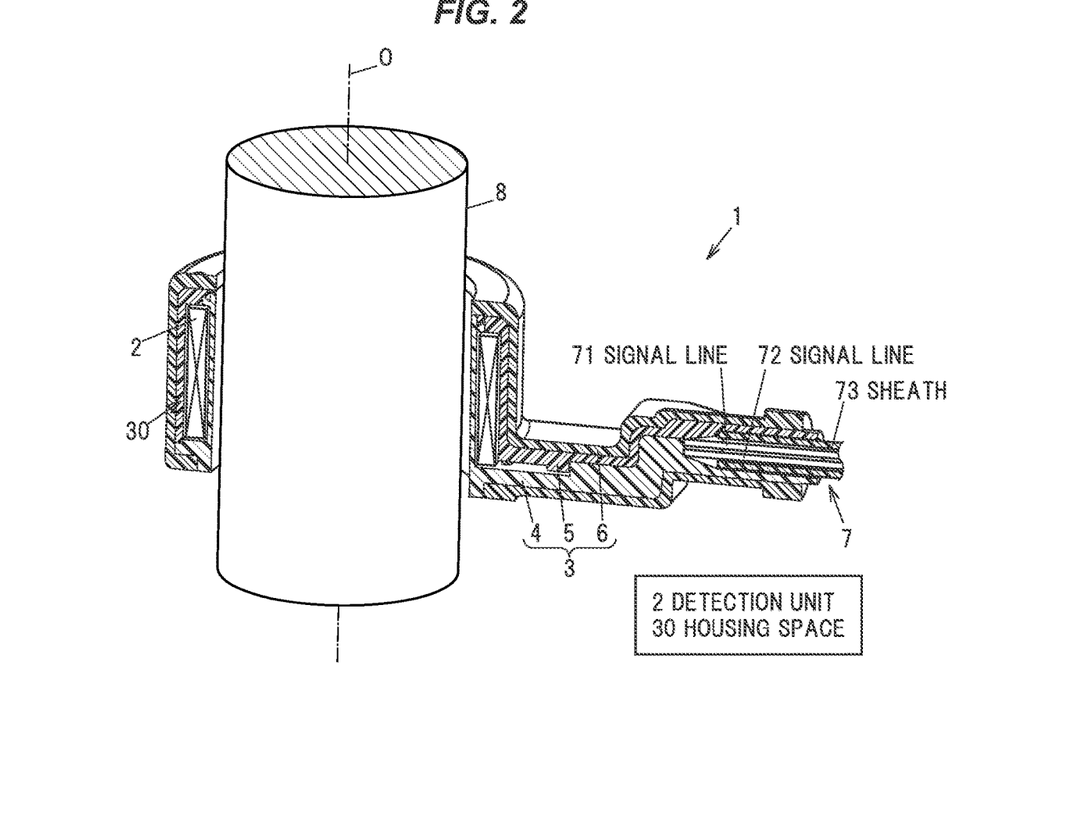
FIG. 2 is a cross-sectional perspective view in which a cross section of the torque sensor taken along line A-A in FIG. 1 is shown with a shaft of which torque is to be detected.

FIG. 1 is an external perspective view showing a torque sensor 1 as an example of a resin-sealed electronic component in an embodiment of the invention. FIG. 2 is a cross-sectional perspective view in which a cross section of the torque sensor 1 taken along line A-A in FIG. 1 is shown with a shaft 8 of which torque is to be detected. The torque sensor 1 is mounted on, e.g., an automobile and detects torque transmitted by the shaft 8. The shaft 8 rotates about a rotational axis O and transmits a drive force of a drive source such as engine.

The torque sensor 1 is configured in such a manner that a cylindrical detection unit 2 as an electronic component main body is sealed with a resin housing 3. "Seal" here means to suppress foreign matter such as liquid or dust from entering the resin housing 3 from outside and coming into contact with the detection unit 2 when the torque sensor 1 is in use. The detection unit 2 outputs an electric signal, which corresponds to a magnitude of torque transmitted by the shaft 8, to a control device (not shown) through a cable 7 extending out of the resin housing 3. The cable 7 has plural electric wires including a pair of signal lines 71, 72 and is formed by collectively covering these plural electric wires with a sheath 73.

The shaft 8 is a ferromagnetic material exhibiting a magnetostrictive effect. Magnetostriction is a phenomenon in which the shape of a ferromagnetic material when magnetized by applying a magnetic field is distorted. By using this phenomenon in an opposite manner and detecting a magnetic field generated due to distortion of the shape by the detection unit 2, torque acting on the shaft 8 can be detected. As the shaft 8, it is possible to preferably use, e.g., a shaft obtained by carburizing, quenching and tempering, and then shot peening a shaft-shaped material made of a chrome steel containing chrome, such as a chrome steel, a chrome-molybdenum steel or a nickel-chrome molybdenum steel.

The resin housing 3 includes first and second resin members 4, 5 and a sealing member 6 that is made of a molding resin and is molded so as to cover at least a portion of each of the first and second resin members 4, 5. The detection unit 2 is housed in a housing space 30 formed between a pair of resin members 4, 5. The housing space 30 is formed in an annular shape so as to surround the shaft 8.

Figure 3A:
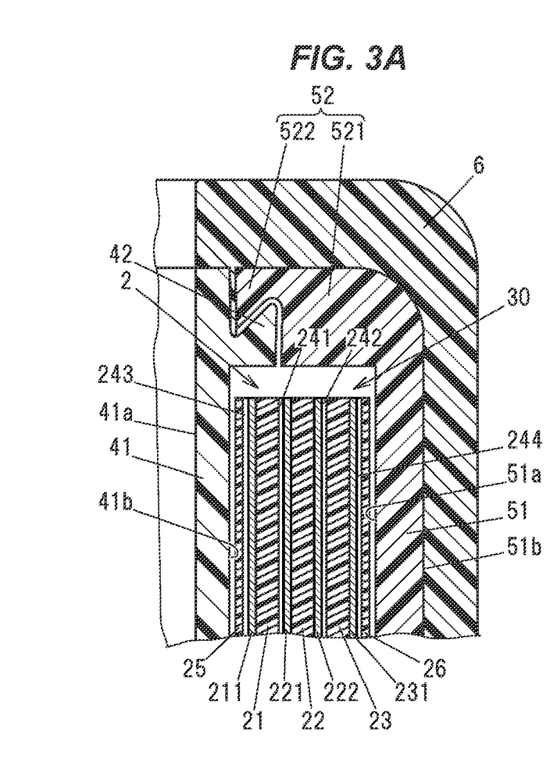
FIG. 3A is an enlarged cross-sectional view showing a portion of the torque sensor.

FIG. 3A is an enlarged cross-sectional view showing a portion of the torque sensor 1. The detection unit 2 has first to third flexible substrates 21 to 23 that are stacked. Wiring patterns 211, 231, 221, 222 made of copper foil are respectively provided on one surface of the first flexible substrate 21, one surface of the third flexible substrate 23 and both surfaces of the second flexible substrate 22, and the second flexible substrate 22 is arranged between the first flexible substrate 21 and the third flexible substrate 23. The first to third flexible substrates 21 to 23 are curved into an annular shape and is housed in the housing space 30.

Adhesive layers 241, 242 are provided respectively between one surface of the second flexible substrate 22 and a surface of the first flexible substrate 21 on which the wiring pattern 211 is not provided and between the other surface of the second flexible substrate 22 and a surface of the third flexible substrate 23 on which the wiring pattern 231 is not provided, and the first to third flexible substrates 21 to 23 are integrated by the adhesive layers 241, 242. In addition, coverlays 25, 26 as protective films are bonded, respectively by adhesive layers 243, 244, to the surface of the first flexible substrate 21 on which the wiring pattern 211 is provided and to the surface of the third flexible substrate 23 on which the wiring pattern 231 is provided.

The wiring patterns 211, 221, 222, 231 on the first to third flexible substrates 21 to 23 form coils to detect a magnetic field generated by distortion of the shaft 8. Each of the first to third flexible substrates 21 to 23 is provided with plural terminals, and some of the terminals are connected to the signal lines 71, 72.

Figure 3B:
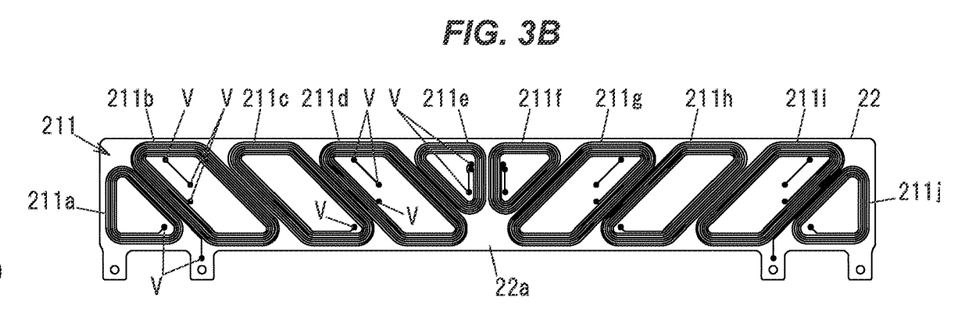
FIG. 3B is a plan view showing a wiring pattern provided on one surface of a second flexible substrate.
Figure 3C:
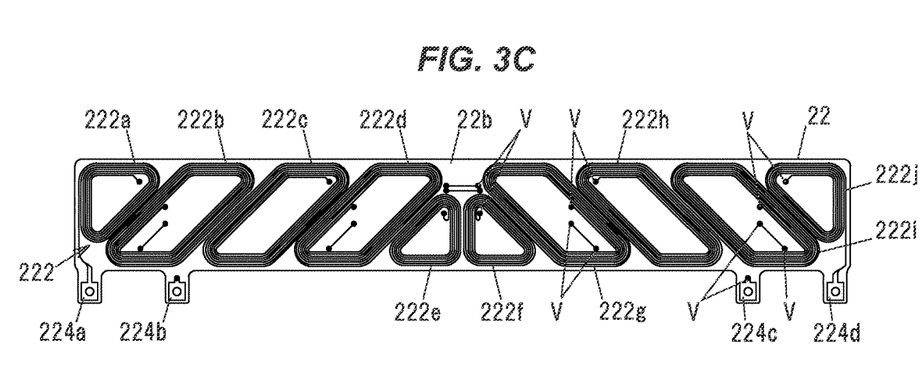
FIG. 3C is a plan view showing a wiring pattern provided on the other surface of the second flexible substrate.

FIG. 3B is a plan view showing the wiring pattern 221 provided on one surface 22a of the second flexible substrate 22. FIG. 3C is a plan view showing the wiring pattern 222 provided on the other surface 22b of the second flexible substrate 22. Ten detection coils 221a to 221j are formed by the wiring pattern 221 on the one surface 22a of the second flexible substrate 22, and ten detection coils 222a to 222j are formed by the wiring pattern 222 on the other surface 22b of the second flexible substrate 22.

Plural vias V indicated by black circles in FIGS. 3B and 3C and plural terminals 224a to 224d are also provided on the second flexible substrate 22. Each via V is used to connect the wiring pattern 221 on the one surface 22a of the second flexible substrate 22 to the wiring pattern 222 on the other surface 22b and also to connect the wiring patterns 221, 222 to the wiring patterns 211, 213 on the first and third flexible substrates 21, 23.

Figure 4A:
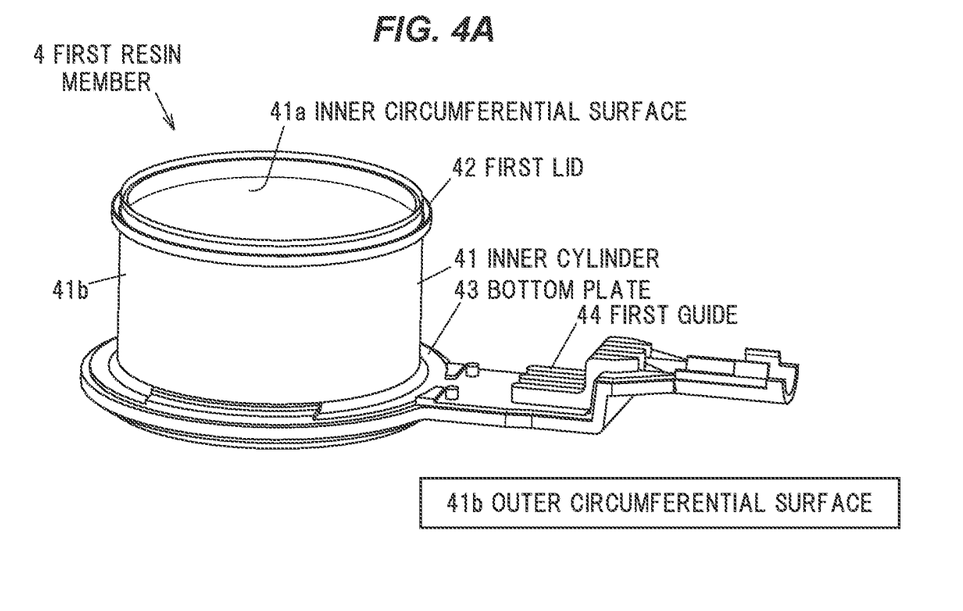
FIG. 4A is an overall perspective view showing a first resin member.
Figure 4B:
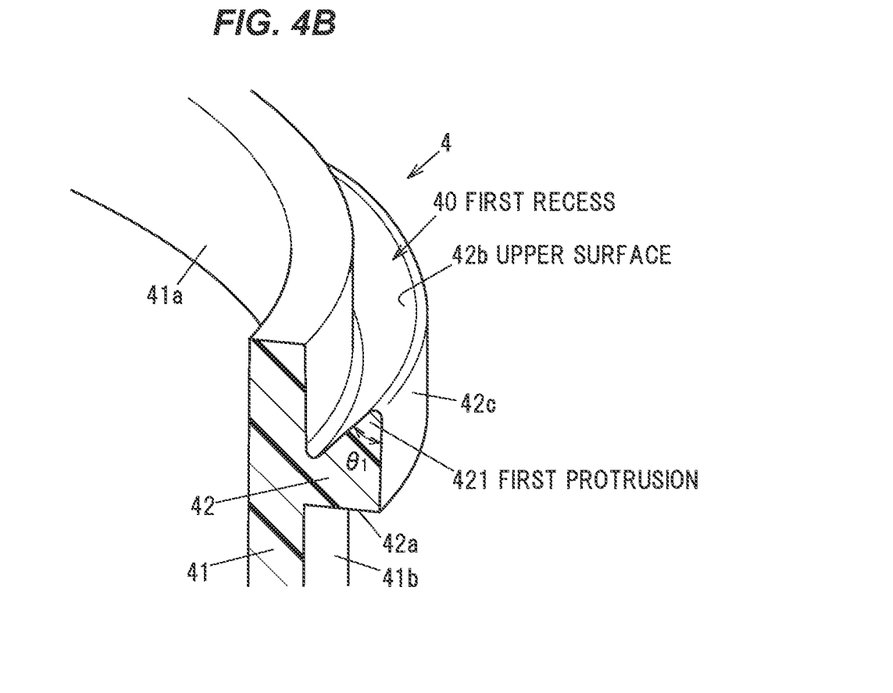
FIG. 4B is a partial perspective view showing a portion of the first resin member.
Figure 5A:
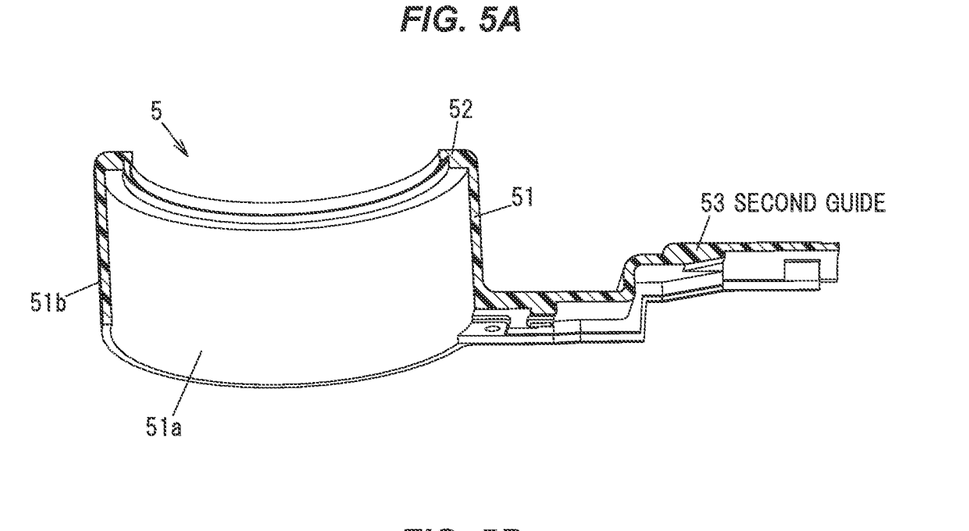
FIG. 5A is a cross-sectional perspective view in which a second resin member is shown in a cross section.
Figure 5B:
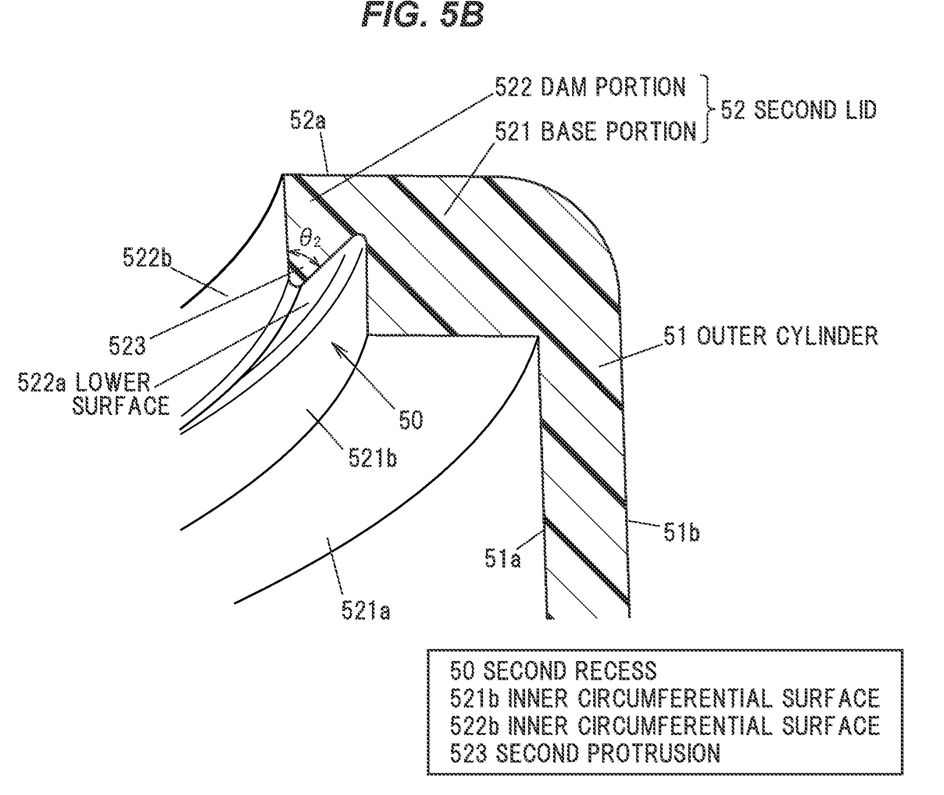
FIG. 5B is a partial perspective view showing a portion of the second resin member.
Figure 6A:
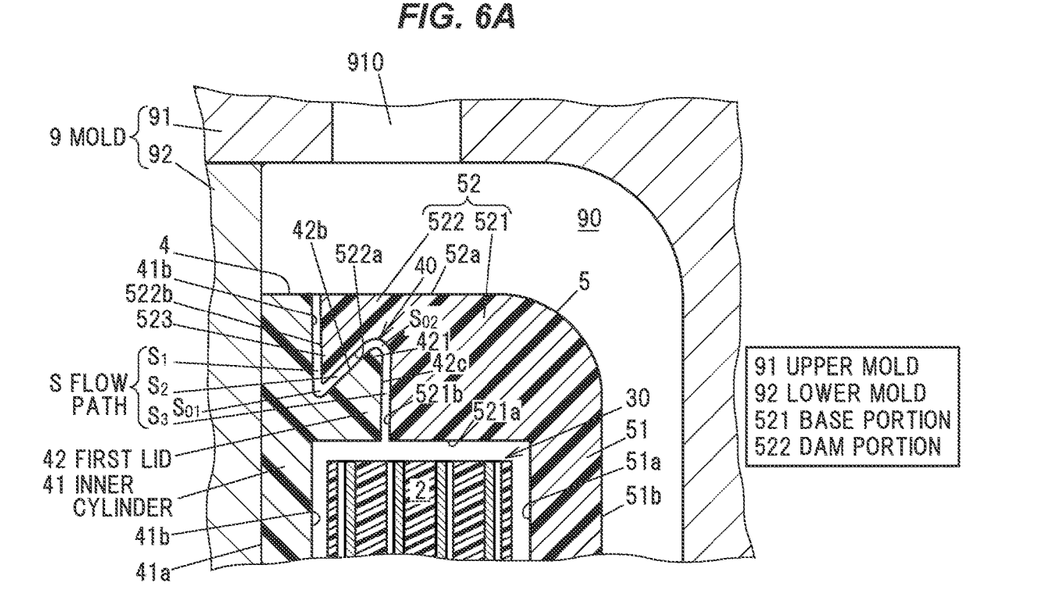
FIGS. 6A and 6B are explanatory diagrams illustrating the states before and after a sealing member is molded using a mold having an upper mold and a lower mold.
Figure 6B:
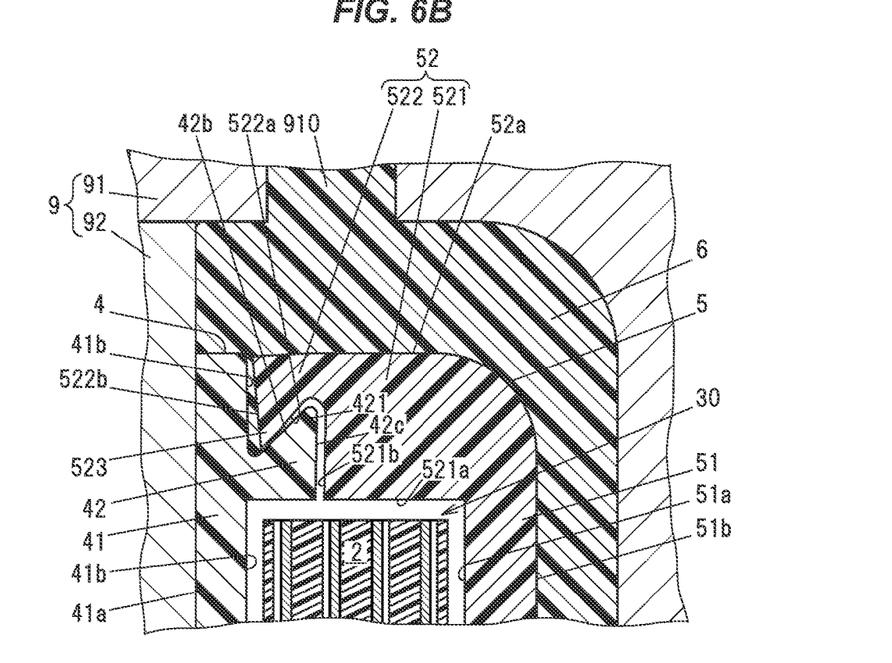

FIG. 4A is an overall perspective view showing the first resin member 4 and FIG. 4B is a partial perspective view showing a portion of the first resin member 4. FIG. 5A is a cross-sectional perspective view in which the second resin member 5 is shown in a cross section and FIG. 5B is a partial perspective view showing a portion of the second resin member 5. FIGS. 6A and 6B are explanatory diagrams illustrating the states before and after the sealing member 6 is molded using a mold 9 having an upper mold 91 and a lower mold 92.

The first and second resin members 4, 5 are formed beforehand by injection molding and combined with each other to provide the housing space 30. When molding the sealing member 6, the first and second resin members 4, 5 are arranged between the upper mold 91 and the lower mold 92 in a state in which the detection unit 2 is housed in the housing space 30, and a molten resin is injected into a cavity 90 through injection holes 910 provided on the upper mold 91. In the present embodiment, one or more injection holes 910 are provided on the upper mold 91. In the present embodiment, three injection holes 910 are provided on the upper mold 91, and three gate marks 31 to 33 (see FIG. 1) respectively corresponding to the injection holes 910 are formed on an end face 6a of the molded sealing member 6 (see FIG. 1).

In the following description, a direction parallel to the rotational axis O of the shaft 8 is referred to as an axial direction, and a direction perpendicular to the rotational axis O is referred to as a radial direction. In the present embodiment, the radial direction corresponds to the "first direction" in the invention and the axial direction corresponds to the "second direction", and the axial direction (the second direction) and the radial direction (the first direction) intersect each other perpendicularly. In addition, in the following description, one side in the axial direction is referred to as an upper side and the other side in the axial direction is referred to as a lower side for the sake of convenience, but this upper and lower do not necessarily means up and down in the vertical direction when the torque sensor 1 is in use.

The first resin member 4 integrally has an inner cylinder 41 formed in a cylindrical shape, a first lid 42 provided near an upper end portion of the inner cylinder 41 so as to protrude radially outward, a bottom plate 43 provided at a lower portion of the inner cylinder 41, and a first guide 44 to guide the signal lines 71, 72 of the cable 7. An inner circumferential surface 41a of the inner cylinder 41 faces the shaft 8. A portion of an outer circumferential surface 41b of the inner cylinder 41 on the lower side of the first lid 42 faces the detection unit 2. The first lid 42 and the bottom plate 43 are formed in an annular shape and protrude radially outward from the outer circumferential surface 41b of the inner cylinder 41. The first guide 44 is formed to protrude further radially outward from an outer edge of the bottom plate 43.

The first lid 42 and the bottom plate 43 are aligned in the axial direction with the housing space 30 therebetween. As shown in FIG. 4B, the first lid 42 has a trapezoidal shape in a cross section taken along the axial direction and a portion thereof is formed as a first protrusion 421 that protrudes upward. A first recess 40 is formed in an annular shape between the first protrusion 421 and the inner cylinder 41. A lower surface 42a of the first lid 42 which faces the bottom plate 43 is perpendicular to the outer circumferential surface 41b of the inner cylinder 41. The first lid 42 is configured in such a manner that a thickness in the axial direction increases toward the outer diameter and an upper surface 42b opposite to the lower surface 42a in the axial direction is inclined relative to the radial direction in such a manner that a distance from the lower surface 42a increases toward the outer diameter.

An outer circumferential surface 42c of the first lid 42 is parallel to the outer circumferential surface 41b of the inner cylinder 41. The first protrusion 421 is formed in a substantially triangular shape in which the upper surface 42b and the outer circumferential surface 42c form an acute angle $\theta_1$ in the cross section taken along the axial direction. A desirable range of the angle $\theta_1$ is not less than 30° and not more than 60°. In the present embodiment, the angle $\theta_1$ is 45°, as an example.

The second resin member 5 integrally has an outer cylinder 51 formed in a cylindrical shape, a second lid 52 provided at an upper portion of the outer cylinder 51, and a second guide 53 to guide the signal lines 71, 72 of the cable 7. An inner circumferential surface 51a of the outer cylinder 51 faces the detection unit 2 and an outer circumferential surface 51b of the outer cylinder 51 is covered with the sealing member 6. The second lid 52 is formed in an annular shape and protrudes radially inward from the inner circumferential surface 51a of the outer cylinder 51. The second guide 53 is formed to protrude radially outward from the outer circumferential surface 51b of the outer cylinder 51.

The first resin member 4 and the second resin member 5 are arranged so that the inner cylinder 41 and the outer cylinder 51 are aligned in the radial direction with the housing space 30 sandwiched therebetween. In addition, the first guide 44 and the second guide 53, when combined with each other, sandwich the sheath 73 and guide the signal lines 71, 72 extending out of the sheath 73 to the housing space 30 side. The first guide 44 and the second guide 53 are substantially entirely covered with the sealing member 6, except end portions at which the cable 7 extends out of the resin housing 3.

The second lid 52 has an annular base portion 521 having a constant thickness in the axial direction and being formed continuously with the outer cylinder 51, and an annular dam portion (blocking portion) 522 provided on the radially inner side of the base portion 521. The dam portion 522 serves to block a flow of a molten resin from a gap with the first resin member 4 toward the housing space 30 during molding the sealing member 6. The molten resin is a molding resin constituting the sealing member 6 that is liquefied by heat.

An upper surface 52a of the second lid 52 is formed as an annular flat surface which is perpendicular to the axial direction and does not have any level differences throughout the base portion 521 and the dam portion 522. The plural injection holes 910 on the upper mold 91 are open at positions facing the upper surface 52a and the molten resin to be the sealing member 6 is injected through the injection holes 910 toward the upper surface 52a.

As shown in FIG. 5B, the dam portion 522 has a trapezoidal shape in a cross section taken along the axial direction and a portion thereof is formed as a second protrusion 523 that protrudes downward.

The second protrusion 523 and the first protrusion 421 are aligned in the axial direction. A lower surface 522a of the dam portion 522 opposite to the upper surface 52a is inclined relative to the radial direction in such a manner that a distance from the upper surface 52a increases toward the inner diameter. A thickness of the base portion 521 in the axial direction is larger than a thickness of a radially inner end portion of the second lid 52 in the axial direction (the largest thickness of the dam portion 522). A lower surface 521a of the base portion 521 is an annular flat surface perpendicular to the inner circumferential surface 51a of the outer cylinder 51, and an inner circumferential surface 521b of the base portion 521 is formed perpendicular to the radial direction. A second recess 50 is formed in an annular shape between the second protrusion 523 and the base portion 521.

An inner circumferential surface 522b of the dam portion 522 is parallel to the inner circumferential surface 51a of the outer cylinder 51. The second protrusion 523 is formed in a substantially triangular shape in which the lower surface 522a and the inner circumferential surface 522b form an acute angle $\theta_2$ in the cross section taken along the axial direction. The angle $\theta_2$ is the same angle as the angle $\theta_1$ of the first protrusion 421 of the first lid 42. When the first resin member 4 and the second resin member 5 are combined, the second protrusion 523 is housed in the first recess 40 and the first protrusion 421 is housed in the second recess 50, and the upper surface 42b of the first lid 42 and the lower surface 522a and the dam portion 522 are parallel and face each other. In addition, the inner circumferential surface 522b of the dam portion 522 and a portion of the outer circumferential surface 41b of the inner cylinder 41 on the upper side of the first lid 42, and also the outer circumferential surface 42c of the first lid 42 and the inner circumferential surface 521b of the base portion 521, are parallel and face each other in the radial direction. In this regard, the angle $\theta_2$ does not necessarily need to be the same angle as the angle $\theta_1$ as long as the angle $\theta_2$ falls within a range of, e.g., the angle $\theta_1 \pm 10°$.

Depending on dimensional tolerances of the first and second resin members 4, 5, a width of a first gap $S_1$ between the inner circumferential surface 522b of the dam portion 522 and the outer circumferential surface 41b of the inner cylinder 41, a width of a second gap $S_2$ between the upper surface 42b of the first lid 42 and the lower surface 522a of the dam portion 522 and a width of a third gap $S_3$ between the outer circumferential surface 42c of the first lid 42 and the inner circumferential surface 521b of the base portion 521 may be not less than a width at which the molten resin can flow (e.g., 1 mm), as shown in FIG. 6A. Then, if the molten resin enters the housing space 30, it causes damage on the detection unit 2 such as deformation of the first to third flexible substrates 21 to 23, or occurrence of wire breakage around the vias V, due to pressure of the molten resin.

In the present embodiment, the second protrusion 523 and the first protrusion 421 overlap in the axial direction to constitute a labyrinth structure, thereby suppressing the molten resin from entering the housing space 30 through a flow path S including the first gap $S_1$, the second gap $S_2$ and the third gap $S_3$. This labyrinth structure is a suppression structure in which a path of the molten resin when flowing through the flow path S toward the housing space 30 is made complicated and the molding resin is thereby suppressed from entering the housing space 30. In more detail, in the cross section of the first and second resin members 4, 5 taken along the axial direction, the flow path S bends at the acute angle $\theta_2$ between the first gap $S_1$ and the second gap $S_2$ and at the acute angle $\theta_1$ between the second gap $S_2$ and the third gap $S_3$ (the flow path S meanders). This increases flow resistance of the molten resin when flowing from the first gap $S_1$ to the second gap $S_2$ and flow resistance of the molten resin when flowing from the second gap $S_2$ to the third gap $S_3$, and the molten resin is thereby suppressed from entering the housing space 30. That is, in the present embodiment, the flow path S of the molten resin when flowing between the first resin member 4 and the second resin member 5 toward the housing space 30 has two bent portions $S_{01}$, $S_{02}$ that bend at an acute angle.

The upper surface 42b of the first lid 42 and the lower surface 522a of the dam portion 522 are facing surfaces that face each other through the second gap $S_2$, and the second gap $S_2$ is inclined so that a distance from the housing space 30 in the axial direction increases toward downstream of the molten resin flowing toward the housing space 30. In this regard, although the entire second gap $S_2$ is inclined so that the distance from the housing space 30 increases toward the third gap $S_3$ located on the downstream side in the present embodiment, it is not limited thereto. At least a portion of the second gap $S_2$ may be inclined so that the distance from the housing space 30 increases from the first gap $S_1$-side to the third gap $S_3$-side.

In addition, in the present embodiment, since the second protrusion 523 located farther from the housing space 30 in the axial direction than the first protrusion 421 is pressed toward the first protrusion 421 by fluid pressure of the molten resin as shown in FIG. 6B and this narrows the gap, the flow of the molten resin toward the housing space 30 is suppressed more reliably. Each injection hole 910 is formed so that at least a portion of its opening is aligned with the second lid 52 in the axial direction, and pressure of the molten resin injected through the injection hole 910 directly acts on the upper surface 52a of the second lid 52. The second lid 52 is deformed by this pressure and the second protrusion 523 is pressed against the upper surface 42b of the first lid 42.

Although FIG. 6B shows a state in which the sealing member 6 is formed with the second protrusion 523 in contact with the upper surface 42b of the first lid 42, the second protrusion 523 may not be in contact with the upper surface 42b of the first lid 42 and the second protrusion 523 may return to the original shape after injection of the molten resin. The molten resin in the injection holes 910 is removed after solidification, and marks after removal are left as the gate marks 31 to 33.

(Method for Manufacturing the Torque Sensor 1)

Next, a method for manufacturing the torque sensor 1 will be described. The torque sensor 1 is manufactured by a preparation step in which the first resin member 4, the second resin member 5 and the detection unit 2 are formed and the cable 7 is connected to the detection unit 2, an arrangement step in which the first and second resin members 4, 5 with the detection unit 2 housed in the housing space 30 is arranged in the mold 9, and an injection molding step in which a molten resin is injected into the mold 9 and the sealing member 6 is molded. In the injection molding step, the second protrusion 523 is pressed toward the first protrusion 421 by fluid pressure of the molten resin as described above, and the flow path of the molten resin when flowing toward the housing space 30 is blocked.

(Comparative Example)

Figure 7:
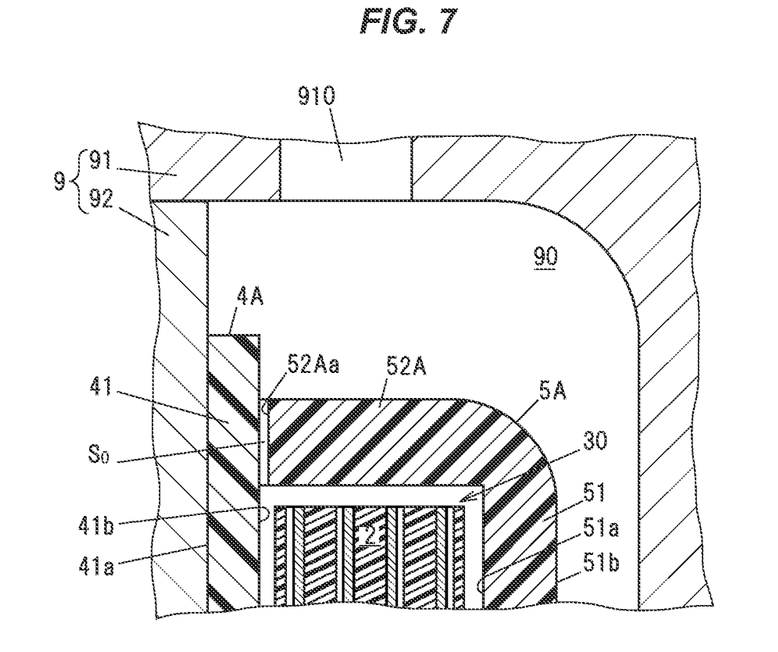
FIG. 7 is a cross sectional view showing an injection molding step for a torque sensor in Comparative Example.

FIG. 7 is a cross sectional view showing the injection molding step for a torque sensor in Comparative Example. In FIG. 7, the same members, etc., as those described in the embodiment are denoted by the same reference numerals as those shown in FIG. 6, etc., and overlapping explanation will be omitted.

This torque sensor has a first resin member 4A and a second resin member 5A, and the detection unit 2 is housed in the housing space 30 between the inner cylinder 41 of the first resin member 4A and the outer cylinder 51 of the second resin member 5A. The first resin member 4A does not have a portion corresponding to the first lid 42 in the embodiment described above. The second resin member 5A has a lid 52A protruding radially inward from an upper end portion of the outer cylinder 51. The lid 52A is formed in an annular plate shape and an inner circumferential surface 52Aa thereof faces the outer circumferential surface 41b of the inner cylinder 41 via an annular gap $S_0$.

In such a configuration, the molten resin injected through the injection holes 910 of the upper mold 91 is likely to flow through the gap $S_0$ in the axial direction and enter the housing space 30, and the detection unit 2 is likely to be damaged. On the other hand, in the embodiment described above, since the second protrusion 523 and the first protrusion 421 are aligned in the axial direction to constitute the labyrinth structure, it is possible to suppress the molten resin from entering the housing space 30 through the flow path S including the first gap $S_1$, the second gap $S_2$ and the third gap $S_3$.

(Modifications)

Figure 8A:
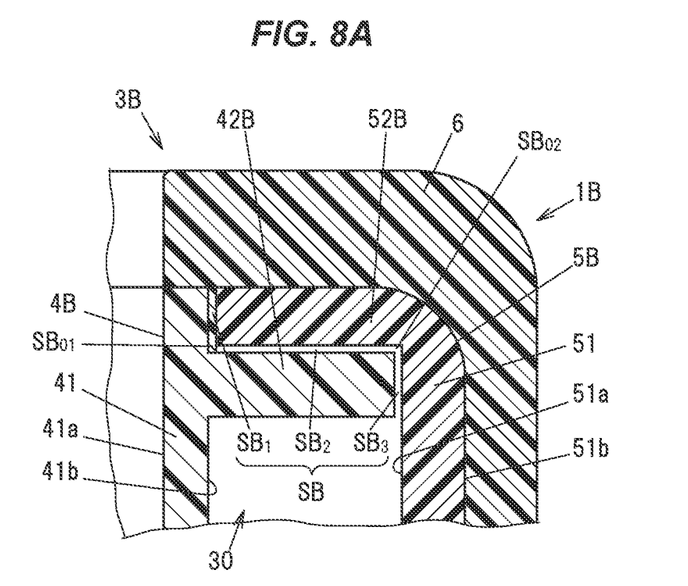
FIGS. 8A and 8B are cross sectional views showing portions of torque sensors in first and second modifications.
Figure 8B:
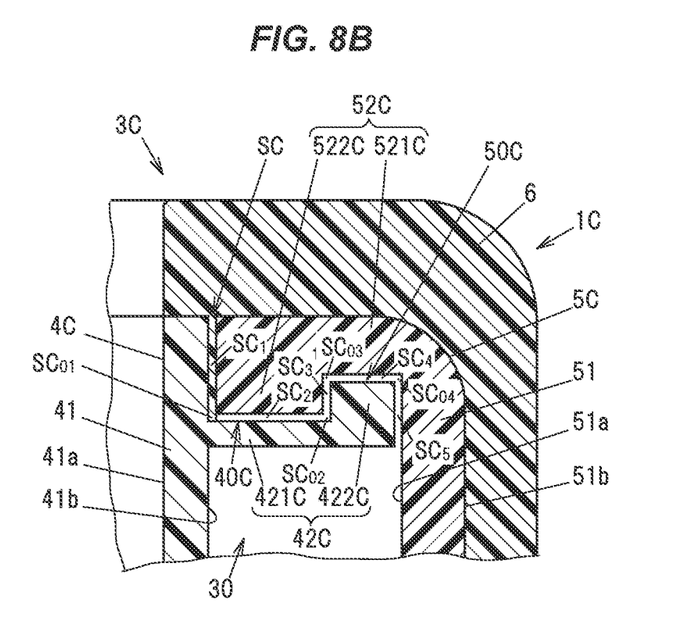
Figure 9A:
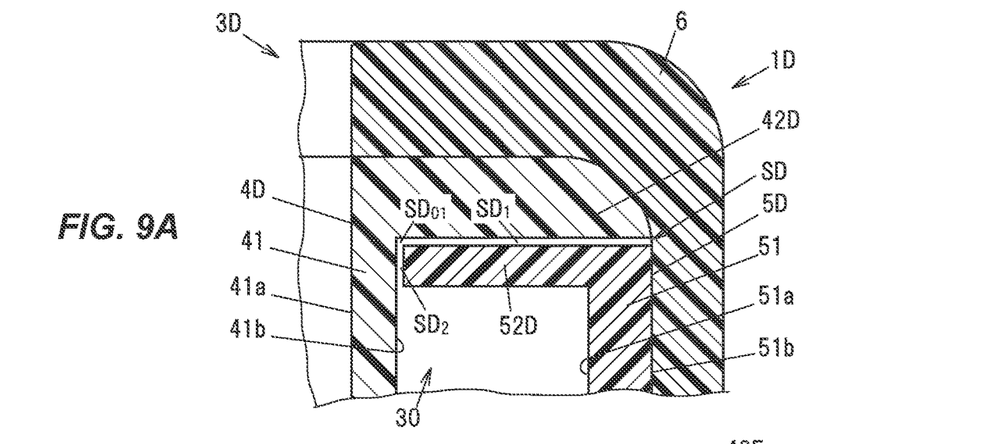
FIGS. 9A to 9C are cross sectional views showing portions of torque sensors in third to fifth modifications.
Figure 9B:
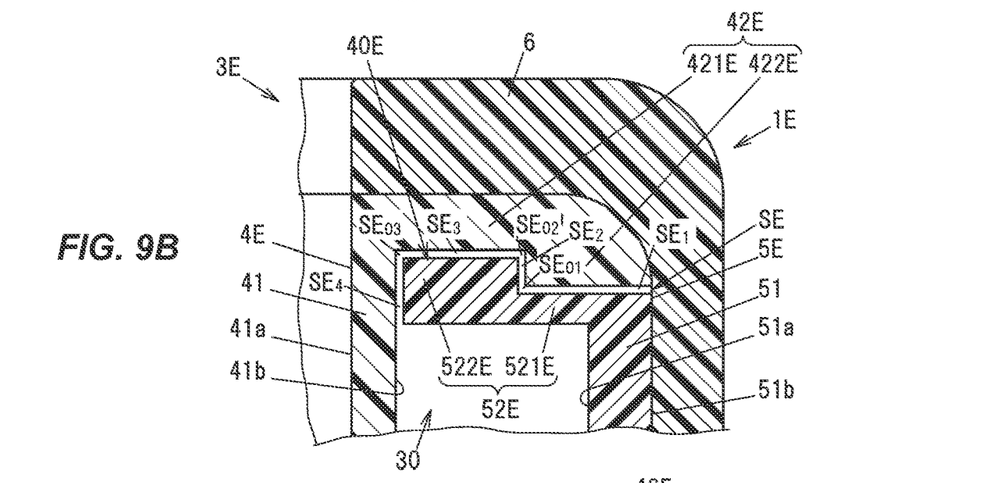
Figure 9C:
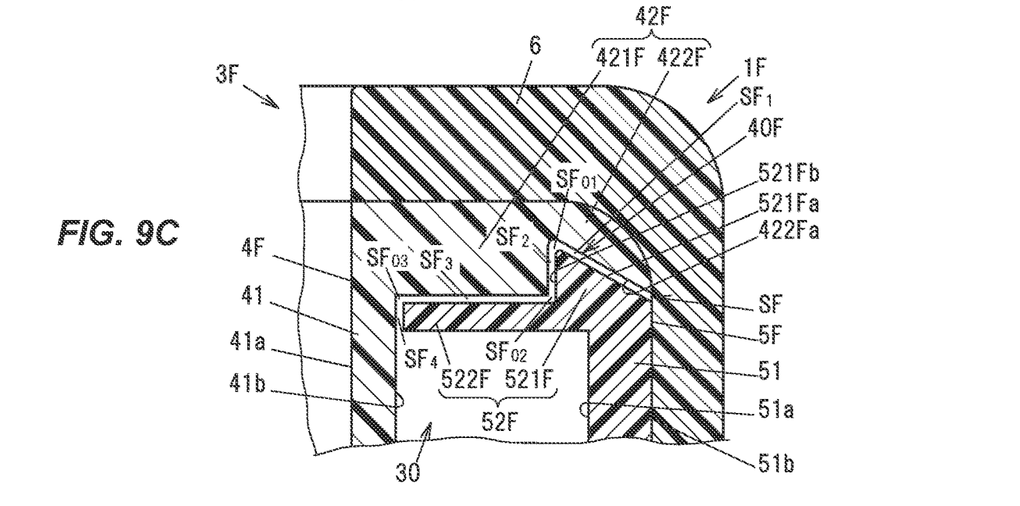

Next, modifications of the embodiment will be described in reference to FIGS. 8 and 9. In FIGS. 8 and 9, the same members, etc., as those described in the embodiment are denoted by the same reference numerals as those shown in FIG. 6, etc., and overlapping explanation will be omitted. In addition, the detection unit 2 housed in the housing space 30 is not shown in FIGS. 8 and 9. The sealing members 6 of torque sensors 1B to 1F in the modifications shown in FIGS. 8 and 9 are molded using the mold 9 shown in FIG. 6.

FIG. 8A is a cross sectional view showing a portion of the torque sensor 1B in the first modification. In the torque sensor 1B, a resin housing 3B is composed of first and second resin members 4B, 5B and the sealing member 6, the first resin member 4B has a first lid 42B protruding radially outward from the inner cylinder 41, and the second resin member 5B has a second lid 52B protruding radially inward from the outer cylinder 51. The first lid 42B and the second lid 52B are both formed in an annular plate shape.

A first gap $SB_1$ in the radial direction between the inner cylinder 41 of the first resin member 4B and the second lid 52B of the second resin member 5B, a second gap $SB_2$ in the axial direction between the first lid 42B of the first resin member 4B and the second lid 52B of the second resin member 5B and a third gap $SB_3$ in the radial direction between the first lid 42B of the first resin member 4B and the outer cylinder 51 of the second resin member 5B form a flow path SB of the molten resin flowing toward the housing space 30. The flow path SB has a bent portion $SB_{01}$ that bends at a right angle at a corner between the first gap $SB_1$ and the second gap $SB_2$.

FIG. 8B is a cross sectional view showing a portion of the torque sensor 1C in the second modification. In the torque sensor 1C, a resin housing 3C is composed of first and second resin members 4C, 5C and the sealing member 6, the first resin member 4C has a first lid 42C protruding radially outward from the inner cylinder 41, and the second resin member 5C has a second lid 52C protruding radially inward from the outer cylinder 51.

The first lid 42C has a first annular plate portion 421C having an annular plate shape and a first protrusion 422C protruding upward from an outer diameter-side end portion of the first annular plate portion 421C, and a first recess 40C is formed in an annular shape between the inner cylinder 41 and the first protrusion 422C. The second resin member 5C has a second annular plate portion 521C having an annular plate shape and a second protrusion 522C protruding downward from an inner diameter-side end portion of the second annular plate portion 521C, and a second recess 50C is formed in an annular shape between the outer cylinder 51 and the second protrusion 522C. The first protrusion 422C and/or the second protrusion 522C are shown in a rectangular shape in FIG. 8B but may have a substantially triangular shape, and the shapes of the second annular plate portion 521C and the first annular plate portion 421C are appropriately changed according to the shapes of the first protrusion 422C and/or the second protrusion 522C.

The first protrusion 422C is aligned with the second annular plate portion 521C in the axial direction, and the second protrusion 522C is aligned with the first annular plate portion 421C in the axial direction. In addition, the first protrusion 422C and the second protrusion 522C are aligned in the radial direction. When the first resin member 4C and the second resin member 5C are combined, the second protrusion 522C is housed in the first recess 40C and the first protrusion 422C is housed in the second recess 50C.

A first gap $SC_1$ in the radial direction between the inner cylinder 41 of the first resin member 4C and the second protrusion 522C, a second gap $SC_2$ in the axial direction between the first annular plate portion 421C and the second protrusion 522C, a third gap $SC_3$ in the radial direction between the first protrusion 422C and the second protrusion 522C, a fourth gap $SC_4$ in the axial direction between the first protrusion 422C and the second annular plate portion 521C and a fifth gap $SC_5$ in the radial direction between the first protrusion 422C and the outer cylinder 51 of the second resin member 5C form a flow path SC of the molten resin flowing toward the housing space 30. The flow path SC has four bent portions $SC_{01}$, $SC_{02}$, $SC_{03}$, $SC_{04}$ that bend at a right angle respectively at a corner between the first gap $SC_1$ and the second gap $SC_2$, a corner between the second gap $SC_2$ and the third gap $SC_3$, a corner between the third gap $SC_3$ and the fourth gap $SC_4$, and a corner between the fourth gap $SC_4$ and the fifth gap $SC_5$.

In the torque sensors 1B, 1C in the first and second modifications, the first lid 42B, 42C and the second lid 52B, 52C are aligned in the axial direction to constitute a labyrinth structure. This labyrinth structure is a suppression structure that suppresses the molten resin from entering the housing space 30 during molding the sealing member 6. In addition, the second lid 52B, 52C is located farther from the housing space 30 in the axial direction than the first lid 42B, 42C and the second lid 52B, 52C is pressed against the first lid 42B, 42C by fluid pressure of the molten resin during molding the sealing member 6. Entrance of the molten resin into the housing space 30 is thereby suppressed more reliably.

FIG. 9A is a cross sectional view showing a portion of the torque sensor 1D in the third modification. In the torque sensor 1D, a resin housing 3D is composed of first and second resin members 4D, 5D and the sealing member 6, the first resin member 4D has a first lid 42D protruding radially outward from the inner cylinder 41, and the second resin member 5D has a second lid 52D protruding radially inward from the outer cylinder 51. The first lid 42D and the second lid 52D are both formed in an annular plate shape, are aligned in the axial direction to constitute a labyrinth structure (a sealing structure).

A first gap $SD_1$ in the axial direction between the first lid 42D of the first resin member 4D and the second lid 52D of the second resin member 5D and a second gap $SD_2$ in the radial direction between the inner cylinder 41 of the first resin member 4D and the second lid 52D of the second resin member 5D form a flow path SD of the molten resin flowing toward the housing space 30. The flow path SD has a bent portion $SD_{01}$ that bends at a right angle at a corner between the first gap $SD_1$ and the second gap $SD_2$.

The first lid 42D is located farther from the housing space 30 in the axial direction than the second lid 52D and entirely covers the second lid 52D and the outer cylinder 51 from above. During molding the sealing member 6, the first lid 42D is pressed against the second lid 52D by fluid pressure of the molten resin and the molten resin is thereby suppressed from flowing into the housing space 30.

FIG. 9B is a cross sectional view showing a portion of the torque sensor 1E in the fourth modification. In the torque sensor 1E, a resin housing 3E is composed of first and second resin members 4E, 5E and the sealing member 6, the first resin member 4E has a first lid 42E protruding radially outward from the inner cylinder 41, and the second resin member 5E has a second lid 52E protruding radially inward from the outer cylinder 51.

The first lid 42E has a first annular plate portion 421E having an annular plate shape and a first protrusion 422E protruding downward from an outer diameter-side end portion of the first annular plate portion 421E, and a recess 40E is formed in an annular shape between the inner cylinder 41 and the first protrusion 422E. The second resin member 5E has a second annular plate portion 521E having an annular plate shape and a second protrusion 522E protruding upward from an inner diameter-side end portion of the second annular plate portion 521E. The first protrusion 422E is aligned with the second annular plate portion 521E in the axial direction, and the second protrusion 522E is aligned with the first annular plate portion 421E in the axial direction. In addition, the first protrusion 422E and the second protrusion 522E are aligned in the radial direction. When the first resin member 4E and the second resin member 5E are combined, the second protrusion 522E is housed in the recess 40E. The second protrusion 522E is shown in a rectangular shape in FIG. 9 but may have a substantially triangular shape, and the shape of the first annular plate portion 421E is appropriately changed according to the shape of the second protrusion 522E.

A first gap $SE_1$ in the axial direction between the first protrusion 422E and the second annular plate portion 521E, a second gap $SE_2$ in the radial direction between the first protrusion 422E and the second protrusion 522E, a third gap $SE_3$ in the axial direction between the first annular plate portion 421E and the second protrusion 522E and a fourth gap $SE_4$ in the radial direction between the inner cylinder 41 of the first resin member 4E and the second protrusion 522E form a flow path SE of the molten resin flowing toward the housing space 30. The flow path SE has three bent portions $SE_{01}$, $SE_{02}$, $SE_{03}$ that bend at a right angle respectively at a corner between the first gap $SE_1$ and the second gap $SE_2$, a corner between the second gap $SE_2$ and the third gap $SE_3$ and a corner between the third gap $SE_3$ and the fourth gap $SE_4$.

The first lid 42E is located farther from the housing space 30 in the axial direction than the second lid 52E and entirely covers the second lid 52E and the outer cylinder 51 from above. During molding the sealing member 6, the first lid 42E is pressed against the second lid 52E by fluid pressure of the molten resin and the molten resin is thereby suppressed from flowing into the housing space 30.

FIG. 9C is a cross sectional view showing a portion of the torque sensor 1F in the fifth modification. In the torque sensor 1F, a resin housing 3F is composed of first and second resin members 4F, 5F and the sealing member 6, the first resin member 4F has a first lid 42F protruding radially outward from the inner cylinder 41, and the second resin member 5F has a second lid 52F protruding radially inward from the outer cylinder 51.

The first lid 42F has a base portion 421F formed continuously with the inner cylinder 41, and an annular eave portion 422F provided on the outer side of the base portion 421F. The base portion 421F is formed in an annular shape with a constant thickness in the axial direction. The eave portion 422F is a protrusion that has a smaller thickness in the axial direction than the base portion 421F and protrudes downward and radially outward from an upper end portion of the base portion 421F. A lower surface 422Fa of the eave portion 422F is inclined so as to be lowered toward an outer diameter-side end portion. An annular recess 40F opening downward is formed in an annular shape between the base portion 421F and the eave portion 422F.

The second lid 52F has a bulging portion 521F formed continuously with the outer cylinder 51, and an annular plate portion 522F that has an annular plate shape and is provided on the inner side of the bulging portion 521F. The bulging portion 521F is a protrusion that has a thickness in the axial direction increasing toward an inner diameter-side and protrudes upward from the annular plate portion 522F. When the first resin member 4F and the second resin member 5F are combined, the bulging portion 521F is housed in the recess 40F and an upper surface 521Fa of the bulging portion 521F is parallel to and faces the lower surface 422Fa of the eave portion 422F. The annular plate portion 522F is formed so that the thickness in the axial direction is smaller than the largest thickness of the bulging portion 521F. An inner circumferential surface 521Fb and the upper surface 521Fa of the bulging portion 521F form an acute angle in a cross section of the second resin member 5F taken along the axial direction.

A first gap $SF_1$ between the eave portion 422F and the bulging portion 521F, a second gap $SF_2$ in the radial direction between the base portion 421F and the bulging portion 521F, a third gap $SF_3$ in the axial direction between the base portion 421F and the annular plate portion 522F and a fourth gap $SF_4$ in the radial direction between the inner cylinder 41 of the first resin member 4F and the annular plate portion 522F form a flow path SF of the molten resin flowing toward the housing space 30. The flow path SF has a bent portion $SF_{01}$ that bends at an acute angle at a corner between the first gap $SF_1$ and the second gap $SF_2$, and two bent portions $SF_{02}$, $SF_{03}$ that bend at a right angle respectively at a corner between the second gap $SF_2$ and the third gap $SF_3$ and a corner between the third gap $SF_3$ and the fourth gap $SR_4$.

In the torque sensors 1D to 1F in the third to fifth modifications, the first lid 42D, 42E, 42F and the second lid 52D, 52E, 52F are aligned in the axial direction to constitute a labyrinth structure that suppresses the molten resin from entering the housing space 30 during molding the sealing member 6. This labyrinth structure is a suppression structure that suppresses the molten resin from entering the housing space 30 during molding the sealing member 6. In addition, the first lid 42D, 42E, 42F is located farther from the housing space 30 in the axial direction than the second lid 52D, 52E, 52F and the first lid 42D, 42E, 42F is pressed against the second resin member 5D, 5E, 5F by fluid pressure of the molten resin during molding the sealing member 6. Entrance of the molten resin into the housing space 30 is thereby suppressed more reliably.

In addition, in the torque sensors 1D to 1F in the third to fifth modifications, the first lid 42D, 42E, 42F entirely covers the second lid 52D, 52E, 52F and the outer cylinder 51 from above. Therefore, a gap between the first lid 42D, 42E, 42F and the second lid 52D, 52E, 52F opens in the radial direction that intersects a flow direction of the molten resin, and the molten resin is less likely to enter this gap. Particularly in the torque sensor 1F in the fifth modification, since the lower surface 422Fa of the eave portion 422F and the upper surface 521Fa of the bulging portion 521F are inclined so that the distance from the housing space 30 in the axial direction increases toward the downstream of the molten resin flowing toward the housing space 30, entrance of the molten resin into the housing space 30 is suppressed further reliably.

(Summary of the Embodiment and the Modifications)

Technical ideas understood from the embodiment will be described below citing the reference numerals, etc., used for the embodiment. However, each reference numeral described below is not intended to limit the constituent elements in the claims to the members, etc., specifically described in the embodiment.

[1] A resin-sealed electronic component (1, 1B-1F), comprising: an electronic component main body (the detection unit 2) sealed with a resin housing (3), wherein the resin housing (3) comprises a pair of resin members (4, 4B-4F, 5, 5B-5F) aligned in a first direction (the radial direction) with sandwiching a housing space (30) housing the electronic component main body (2), and a sealing member (6) comprising a molding resin and being molded so as to cover at least a portion of each of the pair of resin members (4, 4B-4F, 5, 5B-5F), and wherein a portion (42, 42B-42F) of one resin member (4, 4B-4F) of the pair of resin members (4, 4B-4F, 5, 5B-5F) and a portion (522, 52B-52F) of the other resin member (5, 5B-5F) are aligned in a second direction (the axial direction) intersecting the first direction to constitute a suppression structure that suppresses the molding resin (6) from entering the housing space (30).

[2] The resin-sealed electronic component (1, 1C, 1E, 1F) described in [1], wherein at least a portion of a gap (the second gap $S_2$, the third gap $SC_3$, the second gap $SE_2$, the first gap $SF_1$) between a protrusion (the first protrusion 421, the first protrusion 422C, the first protrusion 422E, the eave portion 422F) provided on the one resin member (4, 4C, 4E, 4F) and a protrusion (the second protrusion 523, the second protrusion 522C, the second protrusion 522E, the bulging portion 521F) provided on the other resin member (5, 5C, 5E, 5F) is formed in such a manner that a distance from the housing space (30) in the second direction (the axial direction) increases toward a downstream of the molding resin flowing toward the housing space (30).

[3] The resin-sealed electronic component (1, 1C, 1E, 1F) described in [2], wherein the protrusion (the second protrusion 523, the second protrusion 522C, the second protrusion 522E, the bulging portion 521F) of the other resin member (5, 5C, 5E, 5F) is housed in a recess (the first recess 40, the first recess 40C, the recess 40E, the recess 40F) formed on the one resin member (4, 4C, 4E, 4F).

[4] The resin-sealed electronic component (1, 1B-1F) described in any one of [1] to [3], wherein a flow path (S, SB-SF) of the molding resin, when flowing between the portion (42, 42B-42F) of the one resin member (4, 4B-4F) and the portion (522, 52B-52F) of the other resin member (5, 5B-5F) toward the housing space (30), comprises a bent portion ($S_{O1}$, $S_{O2}$, $SB_{O1}$, $SC_{O1}$, $SC_{O2}$, $SC_{O3}$, $SC_{O4}$, $SD_{O1}$, $SE_{O1}$, $SE_{O2}$, $SE_{O3}$, $SF_{O1}$, $SF_{O2}$, $SF_{O3}$) that bends at an acute angle or a right angle.

[5] A method for manufacturing the resin-sealed electronic component (1, 1B-1F) described in any one of [1] to [4], the method comprising: arranging the pair of resin members (4, 4B-4F, 5, 5B-5F) in a mold (9) in a state in which the electronic component main body (2) is housed in the housing space (30); and injection molding to mold the sealing member (6) by injecting the molten molding resin into the mold (9), wherein, of the portion (42, 42B-42F) of the one resin member (4, 4B-4F) and the portion (522, 52B-52F) of the other resin member (5, 5B-5F), the portion (522, 52B, 52C, 42D, 42E, 42F) located farther from the housing space (30) in the second direction is pressed toward the housing space (30) by fluid pressure of the molten molding resin during the injection molding.

Although the embodiment of the invention and the modifications thereof have been described, the invention according to claims is not to be limited to the embodiment and the modifications described above. Further, please note that not all combinations of the features described in the embodiment are necessary to solve the problem of the invention.

The invention can be appropriately modified and implemented without departing from the gist thereof. For example, although the case where the invention is applied to the torque sensor as an example of the resin-sealed electronic component has been described in the embodiment and the modifications, the resin-sealed electronic component is not limited thereto and the invention is applicable to a sensor that measures a physical quantity by some kind of electrical action, or a resin-sealed electronic component that has some kind of physical effect on an object.

The invention claimed is:

1. A torque sensor comprising a resin-sealed electronic component, comprising:
    an electronic component main body sealed with a resin housing having an annular shape,
    wherein the resin housing comprises a pair of resin members aligned in a first direction with sandwiching a housing space housing the electronic component main body, and a sealing member comprising a molding resin and being molded so as to cover at least a portion of each of the pair of resin members,
    wherein a portion of one resin member of the pair of resin members and a portion of the other resin member are aligned in a second direction intersecting the first direction to constitute a suppression structure that suppresses the molding resin from entering the housing space, and
    wherein the electronic component comprises a plurality of flexible substrates.

2. The resin-sealed electronic component according to claim 1, wherein at least a portion of a gap between a protrusion provided on the one resin member and a protrusion provided on the other resin member is formed in such a manner that a distance from the housing space in the second direction increases toward a downstream of the molding resin flowing toward the housing space.

3. The resin-sealed electronic component according to claim 2, wherein the protrusion of the other resin member is housed in a recess formed on the one resin member.

4. The resin-sealed electronic component according to claim 1, wherein a flow path of the molding resin, when flowing between the portion of the one resin member and the portion of the other resin member toward the housing space, comprises a bent portion that bends at an acute angle or a right angle.

5. A method for manufacturing the torque sensor of claim 1, the method comprising:
    arranging the pair of resin members in a mold in a state in which the electronic component main body is housed in the housing space; and
    injection molding to mold the sealing member by injecting the molten molding resin into the mold,
    wherein, of the portion of the one resin member and the portion of the other resin member, the portion located farther from the housing space in the second direction is pressed toward the housing space by fluid pressure of the molten molding resin during the injection molding.

* * * * *